UNITED STATES PATENT OFFICE 2,415,102

PROCESS FOR THE PREPARATION OF PURE OXYGEN CONTAINING DERIVATIVES OF ALIPHATIC HYDROCARBONS

Alfred Landgraf, Duisburg-Hamborn, and Otto Roelen, Oberhausen-Holten, Germany; vested in the Alien Property Custodian No Drawing. Application February 4, 1941, Serial No. 377,406. In Germany January 27, 1940

2 Claims. (Cl. 260—583)

It has been proposed to prepare aldehydes and ketones by a catalytic reaction between unsaturated hydrocarbons particularly alkenes, or alkene containing mixtures, and gas mixtures containing carbon oxide and hydrogen, e. g. watergas, at working pressures of over 50 atm., preferably 50–150 atm., and at temperatures below 200° C. (392° F.), preferably between 50° C. (122° F.) and 200° C. (392° F.). The following equations illustrate these processes:

(1) 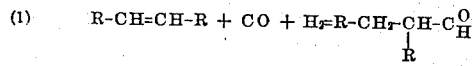

(2) 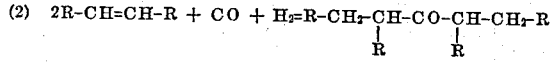

(R being a hydrogen atom or any given organic compound radical). The aldehydes and ketones obtained contain at least one carbon-atom more per molecule than the alkenes used for the reaction. Through oxidation these compounds can easily be converted into fatty acids, while the corresponding alcohols are obtained through a slight reduction, which can be effected, if desired simultaneously with the addition of watergas, when using an excess of hydrogen. If from these alcohols one separates one molecule of water, alkenes are obtained which contain one carbon-atom more per molecule than the alkenes used as basic substances.

When in this way technical alkene mixtures, such as the mixtures obtained by the cracking of hydrocarbons or by the carbon oxide hydrogenation are converted, the preparation of special pure aldehydes and ketones, or of the corresponding fatty acids and alcohols, presents great difficulties. The alkene mixtures always contain a large series of different alkenes which during the catalytic addition of watergas not only produces a mixture of the corresponding aldehydes and ketones, but also a large number of other oxygen containing compounds through subsidiary reactions. Thereby the obtaining of the pure single compounds is made very difficult, and in most cases is technically quite impossible.

These difficulties can be avoided when pure single alkenes are used as basic substances. In that case essentially well defined final products are obtained, which can easily be isolated from the unconverted basic substances.

However, this method is not applicable, since no pure alkenes can be obtained from the unsaturated hydrocarbon mixtures procured in industry. In such mixtures, alkenes of different molecule sizes are present in a mixture with a large number of saturated hydrocarbons. The separation of the alkenes from the paraffins is already extremely difficult. For this purpose it was suggested that selective solvents should be used (e. g. liquid sulphur dioxide), but in this way an economical and satisfactory separation of alkenes and paraffins was not obtainable. But even from an alkene mixture in which no paraffins are present, until now a technically simple preparation of pure, distinct alkenes, e. g. of a $C_8$- or a $C_{10}$-alkene, has not been possible. One can, it is true, by means of strong acids such as sulphuric acid, affect an almost complete separation of primary or secondary alkenes on the one hand, and tertiary alkenes on the other. However, this measure does not result in the obtaining of pure final products by means of the reactions in accordance with the above conversion equations.

It has now been found that notwithstanding the above mentioned difficulties, by the addition of watergas to unsaturated, particularly alkenic, hydrocarbon mixtures, one can obtain pure oxygen containing derivatives of aliphatic hydrocarbons, if the hydrocarbon mixtures to be used as starting materials are divided beforehand into suitably limited single fractions. According to the invention the fractionation of the hydrocarbon mixtures to be used, boiling e. g. between 150° C. (302° F.) and 350° C. (662° F.), is undertaken with reference to the expected final products. In this connection one makes use of the fact that an alkenic hydrocarbon always boils at a lower temperature than the oxygen compound, which is obtained from it by watergas addition.

These differences in boiling point between the alkenes and the oxo-derivatives containing at least one carbon-atom more per molecule are rather important. For example, in the neighbourhood of the $C_6$-alkenes and $C_7$-oxo-derivatives they amount to about 100°–120° C. (180°–216° F.) at atmospheric pressure. For the $C_{12}$-alkene and the $C_{13}$-oxo-derivative a difference of about 50° C. (90° F.) is observed, at a distillation pressure of 20 mm. mercury, and between $C_{17}$-alkenes and $C_{18}$-oxo-derivatives there is still a difference of about 25° C. (45° F.) in boiling points at 5 mm. mercury.

While making use of the relationship of these boiling points, in accordance with the invention the alkenic hydrocarbon mixture used can be divided into single fractions, in such a way that the highest boiling alkene has a lower boiling point than the oxo-derivative obtained from the lowest boiling alkene. In this way the reaction mixture obtained by the addition of watergas can during distillation be easily divided into three fractions separated from each other by sufficiently great differences in boiling points. The lowest boiling fraction contains the unconverted hydrocarbons ($C_n$); the next fraction contains the aldehydes procured in accordance with the first of the above mentioned conversion equations, or the alcohols obtained therefrom by the addition of watergas ($C_{n+1}$); while the distillation residue contains the ketones ($C_{2n+1}$) obtained in accordance with the second equation, and higher reaction products (such as acetales and the like).

Hereunder the way in which the new process is carried out is described in greater detail for the working up of a heavy oil fraction of synthetic or natural origin, boiling between 165° C. (329° F.) and 330° C. (626° F.).

Before the watergas addition the original mixture of alkenic hydrocarbons is divided in four fractions with the following ranges of boiling point:

1st fraction 165–220° C. (329–428° F.), $C_{10}$–$C_{12}$-alkenes

2nd fraction 220–255° C. (428–491° F.), $C_{13}$–$C_{14}$-alkenes

3rd fraction 255–295° C. (491–563° F.), $C_{15}$–$C_{16}$-alkenes

4th fraction 295–330° C. (563–626° F.), $C_{17}$–$C_{19}$-alkenes

From these groups of hydrocarbon mixtures, through the catalytic addition of watergas, oxo-compounds are obtained of the following molecule sizes respectively:

From the 1st fraction $C_{11}$–$C_{13}$-oxo-derivatives are obtained.

From the 2nd fraction $C_{14}$–$C_{15}$-oxo-derivatives are obtained.

From the 3rd fraction $C_{16}$–$C_{17}$-oxo-derivatives are obtained.

From the 4th fraction $C_{18}$–$C_{20}$-oxo-derivatives are obtained.

The range of temperatures at which each fraction of these oxocompounds boils is much higher than the highest boiling point of the corresponding alkene-fraction used as basic substance. During the working up of the reaction products obtained which, after removal of the catalyser used and preferably after the subsequent reduction of the aldehydes to alcohols, is carried out through fractionated vacuum distillation, the hydrocarbons present and the oxocompounds obtained cannot overlap each other, so that the aldehydes or alcohols are obtained in a pure state.

The aldehydes or alcohols obtained are easily oxidised to fatty acids in the usual way. Since the alkenes originally used can be almost perfectly separated, when necessary into single molecular sizes, in this way quite distinct alcohols, aldehydes, and fatty acids can be obtained. For industrial purposes (for example for the preparation of washing materials), fractionation up to 3 molecule sizes is generally sufficient. The hydrocarbons left over in the treatment of the products obtained by the addition of watergas can be reused as basic substances in the process.

As regards their purity, the fatty acids obtained as described above comply with all the requirements for basic substances for the soap- and washing means industry. They can also be used for many purposes in the preparation of articles of food. The corresponding alcohols are particularly suitable as solvents, or in the preparation of synthetic resins.

As basic substances for the present process all unsaturated hydrocarbon mixtures of natural or synthetic origin can be used, for example, fractions of the thermic or catalytic hydrocarbon-cracking, or of the pressure-hydrogenation. Because of their high degree of purity, synthesis products of carbon oxide hydrogenation are particularly suitable.

Next to the preparation of valuable fatty acids and alcohols the process as described above can also be used for the preparation of pure alkenes. In this case the corresponding single alcohols are first prepared, whereupon they are converted to alkenes, for example by means of phosphoric acid under removal of water. It is well known from experience that alcohols can be very satisfactorily separated from each other, so that in this way even isomeric alkenes, with almost identical boiling points can be most satisfactorily isolated. Since the addition of watergas chiefly results in producing side chains, in this way ramified alkenes, which are very valuable for many applications, become easily available.

In the separation of $C_4$-fractions, from the possible $C_4$-alkenes, namely isobutylene (isobutene, boiling point$=-6°$ C. or 21° F.), asymmetrical butylene (butene-1, boiling point$=-5°$ C. or 23° F.), and symmetrical butylene (butene-2, boiling point$=+1°$ C. or 34° F.), the two first mentioned cannot be separated from each other by distilaltion. If one converts the $C_4$-alkene mixture through the addition of watergas and subsequent reduction into the corresponding $C_5$-alcohols, one obtains from isobutylene an isoamylic alcohol (boiling point 130° C. or 266° F.), or a secondary amylic alcohol (methylisopropylcarbonol) boiling at 113° C. (235° F.), while from the asymmetrical butylene (butene-1) the normal, primary amylic alcohol, boiling at 138° C. (280° F.) is obtained. These $C_5$-alcohols can easily be separated from each other. Through removal of water from these alcohols the corresponding pure $C_5$-alkenes are obtained.

What we claim is:

1. The steps in the process of preparing pure oxo compounds of alkene hydrocarbons including aldehydes, alcohols, fatty acids and ketones, from hydrocarbon mixtures containing alkenes which comprises dividing the hydrocarbon mixtures into alkene fractions containing molecules having carbon atoms in the molecule differing in number from two to three, forming oxo compounds from the individual alkenes of each fraction by catalytic action with CO and H and said alkenes, continuing this catalytic action until the number of carton atoms to the molecule has been raised one, whereby the range of temperature at which each fraction containing these oxo fractions boils is much higher than the highest boiling point of the corresponding alkene fraction of the original mixture, removing the catlyzer from each fraction, reducing the aldehydes to alcohol, fractionating by vacuum whereby the alcohols are obtained in a pure state.

2. The steps of the process of preparing pure oxo compounds of alkene hydrocarbons including aldehydes, alcohols, fatty acids and ketones from hydrocarbon mixtures containing alkenes which comprises dividing the hydrocarbon mixtures into fractions, in which the first fraction $C_{10}$–$C_{12}$ alkenes boils at 165°–220° C., the second fraction $C_{13}$–$C_{14}$ alkenes boils at 200°–225° C., the third fraction $C_{15}$—$C_{16}$ alkenes boils at 255°–291° C., the fourth fraction $C_{17}$—$C_{20}$ alkenes boils at 295°–350° C., forming oxo compounds including aldehydes, alcohols, fatty acids and ketones from the individual alkenes of each fraction by catalytic action with CO and H continuing this catalytic action until the number of carbon atoms to the molecule has been raised one, whereby the range of temperature at which each fraction containing these oxo fractions boils is much higher than the highest boiling point of the corresponding alkene fraction of the original mixture, removing the catalyzer from each fraction, reducing the aldehydes to alcohols, fractionating by vacuum distillation whereby the alcohols are obtained in a pure state.

ALFRED LANDGRAF.
OTTO ROELEN.

REFERENCES CITED

The following references are of record in the file of this patent:

UNITED STATES PATENTS

| Number | Name | Date |
|---|---|---|
| 2,035,189 | Ramage | Mar. 24, 1936 |
| 2,159,077 | Duftschmidt | May 23, 1939 |
| 2,327,066 | Roelen | Aug. 17, 1943 |
| 1,753,516 | James | Apr. 8, 1930 |
| 1,973,662 | Schalch | Sep. 11, 1934 |
| 2,151,106 | Hentrich | Mar. 21, 1939 |

FOREIGN PATENTS

| Number | Country | Date |
|---|---|---|
| 376,283 | Italy | Nov. 9, 1939 |

OTHER REFERENCES

"Chemistry of Petroleum Derivatives," Ellis, 1934, vol. 1, pages 137–139.

"Brennstoff Chemie," Fisher, Nr 2, Bd. 9 (1928), pages 21–24.

"Brennstoff Chemie," Fisher, Nr 22, Bd. 13 (1934), pages 421-428.

"Brennstoff Chemie," Fisher, Nr 24, Bd. 13 (1932), pages 461–68.